H. H. C. DUNWOODY.
ELECTRIC HEATER.
APPLICATION FILED FEB. 17, 1922.
1,436,867.
Patented Nov. 28, 1922.
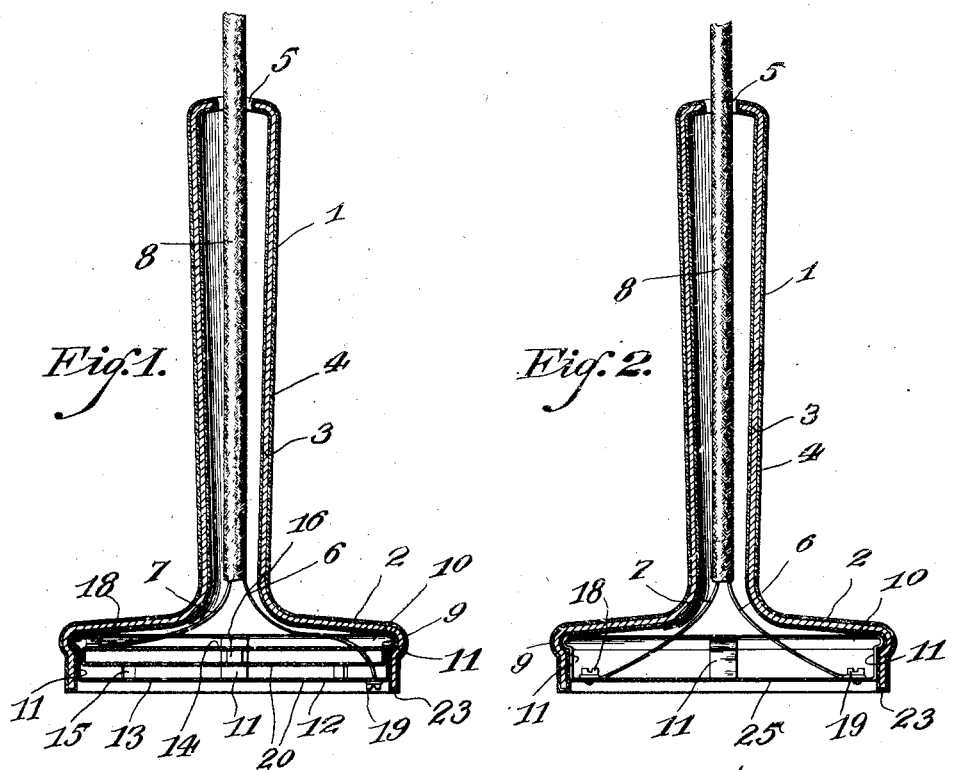
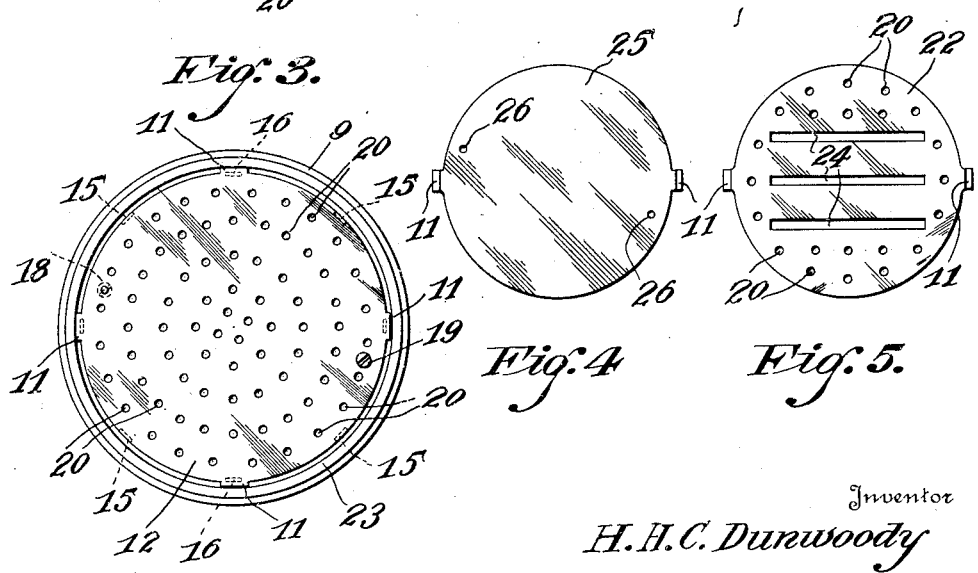
Inventor
H. H. C. Dunwoody
By
Attorney Patented Nov. 28, 1922.

1,436,867

UNITED STATES PATENT OFFICE.

HENRY H. C. DUNWOODY, OF WASHINGTON, DISTRICT OF COLUMBIA.

ELECTRIC HEATER.

Application filed February 17, 1922. Serial No. 537,218.

*To all whom it may concern:*

Be it known that I, HENRY H. C. DUNWOODY, brigadier general, U. S. A., retired, a citizen of the United States, residing at Washington, in the District of Columbia, have invented certain new and useful Improvements in Electric Heaters; and I do hereby declare the following to be a full, clear, and exact description of the invention, such as will enable others skilled in the art to which it appertains to make and use the same.

This invention relates to electric heaters especially adapted for heating water and for other purposes, and has for its object to provide an apparatus of this character which will be simple in construction, comparatively inexpensive to manufacture, and more efficient in action than those heretofore proposed.

With these and other objects in view, the invention consists in the novel details of construction and combinations of parts more fully hereinafter disclosed and particularly pointed out in the claims.

Referring to the accompanying drawings forming a part of this specification, in which like numerals designate like parts in all the views:

Figure 1 is a sectional view of an electric heater made in accordance with this invention;

Figure 2 is a view similar to Figure 1 showing a somewhat modified form;

Figure 3 is a bottom plan view of the parts shown in Figure 1, looking upwardly;

Figure 4 is a plan view of one form of heating disk; and

Figure 5 is a plan view of a somewhat modified form of heating disk.

1 indicates any suitable handle or support for the heating elements, provided with an enlarged flat like portion 2 to form a casing, and this casing is preferably made of an inner steel or other metal core 3 covered with an insulating coating 4 preferably of a silicious or porcelain like material. In fact, the entire casing may conveniently be made of what is known on the market as "granite ware." The upper end of the handle 1 is provided with an opening 5, through which passes the lead wires 6 and 7 covered by any suitable insulator 8. The flat like portion 2 of the casing is provided with the bulged portion 9 forming an interior annular bead 10 into which may snap the curved lugs 11 rigid with the heating disk 12, all as will be clear from Figure 1. Above said heating disk 12 are located a plurality of heating disks such as 13 and 14, and the disk 13 is supported from the lowermost disk 12 as by the lugs 15 while the uppermost disk 14 is likewise supported from a lower disk as by the similar lugs 16. The lead wire 7 is secured to the uppermost disk 14 by any suitable means as by the screw connection 18, and the lead wire 6 is secured to the lower disk 12 as by the screw connection 19. In this particular form of the invention shown in Figure 1, current may enter as by the wire 7, traverse the disk 14, the lug 16, the disk 13, the lugs 15, the disk 12, and then pass out through the wire 6. The disks 12, 13 and 14 are preferably made of very thin sheet iron or sheet steel, so that their resistance is relatively high. In addition to this, said disks are further preferably provided with numerous perforations or holes 20, which still further increase the resistance of said disks.

It results from this that whether an alternating or a direct current is passed through the said disks in the manner disclosed, they will rapidly heat according to the resistance they offer to such current, and should the lower portion 2 of the casing be immersed in water, to heat the same, the disks being flat and spaced relatively close together, the said disks will be covered with water even though the latter be quite shallow.

It results from this that should one turn on water in a bath tub, he is enabled to place the heater in the tub almost immediately and still have the disks well covered with water and thus run no risk of unduly heating the disks when they are not covered with water and thus avoid the oxidation of the same as well as other troubles which are liable to ensue should said disks not be completely immersed.

When the disks wear out, it is only necessary to snap out the three disks 12, 13 and 14 illustrated in Figure 1, disconnect the lead wires 6 and 7 therefrom, connect up said wires with a new set of disks provided with the spring catches 11, and snap the new set of disks into place, whereupon the heater is ready for use again.

In the somewhat modified form of the invention illustrated in Figure 2, the construction is the same except instead of having a plurality of disks only one disk 25 is employed. This said disk enables one to use the heater in water which is still more shallow than is required for the form shown in Figure 1. In fact as this disk 25 is located within, say, ¼ inch or less of the extreme insulated lower edge 23 of the casing, the water need not be deeper than say ¼ inch or a half a inch before the disk is completely covered. Said disk is preferably made in the form illustrated in Figure 5, wherein a plurality of holes 20 are provided as well as a plurality of slits 24 are provided in order to increase the resistance of the said disk 22.

The form of the disk 25 shown in Figure 4 is or may be substantially solid throughout. That is to say, the holes 26 shown therein are for the reception of the connecting screws 18 and 19, see Figures 1 and 3, and the current passes throughout the metal portion of the disk without being interrupted by perforations.

It will thus be seen that in all the forms I am enabled to avoid the overheating of the resistor due to the water not being sufficiently deep to cover the entire dimensions of said resistor. That is to say, I have found from actual experience in the use of a well known water heater on the market which is provided with a helically arranged resistor, unless the water is of a sufficient depth to cover the entire helix of said resistor, the latter heats unequally, it is liable to burn out and also to blow the fuse of the feed line. With this form of heater, on the other hand, the resistor elements are flat, they are in a very shallow plane, and it results that the water may only be, say, ¾ inch deep or less in order to entirely cover said resistors and therefore the troubles heretofore experienced due to unequal heatings of the resistors is entirely avoided.

In addition to the above, it is obvious that this particular form of heater is useful for many other purposes besides the mere heating of water. In other words, should the handle portion 1 be turned upside down so that the flat portion 2 and edge 23 of the casing will be uppermost, then the resistor elements 12 or 25 will furnish heat very much as would a red hot stove, and all sorts of articles can be rested on said edge 23 and the heat generated applied thereto.

It is obvious that those skilled in the art may vary the details of construction, as well as the arrangement of parts, without departing from the spirit of the invention, for example a spirally wound wire in a flat plane may be substituted for the disks and therefore I do not wish to be limited to the above disclosure except as may be required by the claims.

What I claim is:

1. In an electric heater the combination of a hollow handle portion; a flat resistor receiving portion provided with an open end and an annular interior depression; a flat resistor element provided with a spring like holding element adapted to snap into and out of said depression; and electric current conveying wires carried by said handle portion and joined to said resistor element, substantially as described.

2. In an electric heater the combination of a hollow handle portion; a flat resistor receiving portion provided with an annular interior depression; a flat perforated disk like resistor element provided with a spring like holding element adapted to snap into said depression; and insulated electric current conveying wires carried by said handle portion and joined to said resistor element, substantially as described.

3. In an electric heater the combination of a casing made of sheet material having an insulating covering and comprising an elongated handle portion, and a flat resistor receiving portion, provided with an open end and an interior annular groove; a resistor element provided with holding lugs having curved ends adapted to snap into said groove; and lead wires passing through said handle portion and joined to said resistor element, substantially as described.

4. In an electric heater the combination of a casing made of sheet material having an insulating covering and comprising an elongated handle portion, and a flat resistor receiving portion provided with an interior annular groove; a resistor element comprising a plurality of perforated disks provided with holding lugs having curved ends adapted to snap into said groove; and lead wires passing through said handle portions and joined in series to the disks of said resistor element, substantially as described.

In testimony whereof I affix my signature.

HENRY H. C. DUNWOODY.